US012308139B2

(12) United States Patent
Hiratsuka et al.

(10) Patent No.: US 12,308,139 B2
(45) Date of Patent: May 20, 2025

(54) ELECTRIC WIRE PRINTING DEVICE

(71) Applicant: Shinmaywa Industries, Ltd., Takarazuka (JP)

(72) Inventors: Tomohiro Hiratsuka, Takarazuka (JP); Yoshihiro Fujita, Takarazuka (JP)

(73) Assignee: SHINMAYWA INDUSTRIES, LTD., Hyogo (JP)

( * ) Notice: Subject to any disclaimer, the term of this patent is extended or adjusted under 35 U.S.C. 154(b) by 0 days.

(21) Appl. No.: 18/576,431

(22) PCT Filed: Jun. 21, 2022

(86) PCT No.: PCT/JP2022/024761
§ 371 (c)(1),
(2) Date: Jan. 4, 2024

(87) PCT Pub. No.: WO2023/282053
PCT Pub. Date: Jan. 12, 2023

(65) Prior Publication Data
US 2024/0312675 A1 Sep. 19, 2024

(30) Foreign Application Priority Data
Jul. 9, 2021 (JP) ................................ 2021-114066

(51) Int. Cl.
*H01B 13/34* (2006.01)
*B41J 3/407* (2006.01)
*B41J 11/00* (2006.01)

(52) U.S. Cl.
CPC .......... *H01B 13/345* (2013.01); *B41J 3/4073* (2013.01); *B41J 11/0022* (2021.01); *B41J 11/007* (2013.01)

(58) Field of Classification Search
CPC ... H01B 13/345; B41J 11/007; B41J 11/0022; B41J 3/4073
See application file for complete search history.

(56) References Cited

U.S. PATENT DOCUMENTS 4,934,929 A * 6/1990 Kelly .................... F27B 9/3011 432/59
5,237,917 A 8/1993 Traut et al.
(Continued)

FOREIGN PATENT DOCUMENTS

CN 206326998 U 7/2017
CN 207124078 U 3/2018
(Continued)

OTHER PUBLICATIONS

Official Communication issued in corresponding European Patent Application No. 22837470.8, mailed on Sep. 16, 2024, 37 pages.
(Continued)

*Primary Examiner* — David H Banh
(74) *Attorney, Agent, or Firm* — Keating & Bennett, LLP

(57) ABSTRACT

An electric wire printing device 10 according to the present invention includes an inkjet head 30 injecting ink to perform printing on an electric wire 5; a transportation device 20 transporting the electric wire 5; and a drying device 40 provided downstream, in a transportation direction of the electric wire 5, with respect to the inkjet head 30, the drying device 40 blowing air toward a printed portion on the electric wire 5.

4 Claims, 5 Drawing Sheets

(56) References Cited

U.S. PATENT DOCUMENTS

| | | | | |
|---|---|---|---|---|
| 5,285,723 | A | 2/1994 | Ichikawa et al. | |
| 2004/0040171 | A1 * | 3/2004 | Listmann | F26B 21/004 34/229 |
| 2011/0174513 | A1 * | 7/2011 | Brosseau | H01B 13/003 174/15.6 |
| 2012/0096709 | A1 * | 4/2012 | Jo | H05K 3/1275 29/745 |
| 2012/0312596 | A1 | 12/2012 | Taniguchi et al. | |

FOREIGN PATENT DOCUMENTS

| | | | |
|---|---|---|---|
| CN | 109461544 | A | 3/2019 |
| CN | 109501453 | A | 3/2019 |
| CN | 209496667 | U | 10/2019 |
| CN | 212209039 | U | 12/2020 |
| CN | 112185630 | A | 1/2021 |
| JP | 04-36908 | A | 2/1992 |
| JP | 05-31027 | U | 4/1993 |
| JP | 05-338116 | A | 12/1993 |
| JP | 2001-088280 | A | 4/2001 |
| JP | 2011-181396 | A | 9/2011 |

OTHER PUBLICATIONS

Official Communication issued in International Patent Application No. PCT/JP2022/024761, mailed on Aug. 23, 2022.

* cited by examiner

ELECTRIC WIRE PRINTING DEVICE

TECHNICAL FIELD

The present invention relates to an electric wire printing device.

BACKGROUND ART

Printing on an electric wire has been conventionally performed. For example, Patent Literature 1 discloses a wire harness production method including printing, on an electric wire, circuit information representing to which element the electric wire is to be connected.

CITATION LIST

Patent Literature

Patent Literature 1: Japanese Laid-Open Patent Publication No. 2011-181396

SUMMARY OF INVENTION

Technical Problem

Printing on an electric wire as described above may be performed by use of an inkjet head that injects ink onto a printing target. However, it requires a certain length of time to dry the ink landed on the electric wire. If the next step is performed before the ink is dried, an inconvenience is likely to occur such that, for example, ink is smudged. For these reasons, production of an electric wire including a step of inkjet printing is time-consuming.

The present invention, made in light of such a point, has an object of providing an electric wire printing device performing printing on an electric wire by an inkjet method and drying ink in a short time.

Solution to Problem

An electric wire printing device according to the present invention includes an inkjet head injecting ink to perform printing on an electric wire; a transportation device transporting the electric wire; and a drying device provided downstream, in a transportation direction of the electric wire, with respect to the inkjet head, the drying device blowing air toward a printed portion on the electric wire.

According to the above-described electric wire printing device, the air blown toward the printed portion on the electric wire by the drying device promotes the drying of the ink of the printed portion. Therefore, the ink is dried in a short time.

According to a preferred embodiment of the present invention, the transportation device transports the electric wire while the drying device is blowing the air toward the printed portion on the electric wire. The drying device blows the air upstream in the transportation direction of the electric wire.

According to this embodiment, the transportation direction, in which the electric wire is transported by the transportation device, and the direction in which the air flows are opposite to each other. Therefore, the flow of the air flows at a speed, with respect to the electric wire, that is a sum of a transportation speed of the electric wire and a speed of the air. As a result, the drying of the ink is further promoted.

According to a preferred embodiment of the present invention, the transportation device transports the electric wire in a longitudinal direction of the electric wire. The drying device includes a tubular member provided so as to surround a transportation path of the electric wire. An inner space through which the electric wire is to pass is demarcated in the tubular member. The tubular member includes a supply inlet opened toward the inner space, the supply inlet allowing compressed air to be supplied therethrough, and an opening allowing the inner space and a space outside the tubular member to communicate with each other such that the compressed air is discharged from the inner space.

According to this embodiment, the printed portion of the electric wire is surrounded by the tubular member. Therefore, the compressed air supplied into the tubular member is not easily diffused. This improves the efficiency at which the ink is dried. Therefore, the ink is dried in a shorter time.

According to a preferred embodiment of the above-described embodiments, the transportation device transports the electric wire while the compressed air is supplied from the supply inlet. The opening is provided upstream, in the transportation direction of the electric wire, with respect to the supply inlet.

According to this embodiment, the transportation direction, in which the electric wire is transported by the transportation device, and the direction in which the compressed air flows are opposite to each other. Therefore, the drying of the ink is further promoted for the above-described reason.

According to a preferred embodiment of the above-described embodiments, the opening is provided at an upstream end, in the transportation direction of the electric wire, of the tubular member. The transportation device inserts the electric wire into the inner space of the tubular member from the opening.

According to this embodiment, one opening is usable both as an entrance for the electric wire into the tubular member and an exit for the compressed air from the tubular member. This simplifies the configuration of the tubular member.

According to a preferred embodiment of the embodiments in which the electric wire printing device includes the tubular member, the tubular member includes an electric wire exit allowing the electric wire to pass therethrough, the electric wire exit being provided at a downstream end, in the transportation direction of the electric wire, of the tubular member. The electric wire exit has an opening area that is smaller than an opening area of the opening.

According to this embodiment, the opening area of the electric wire exit is smaller than the opening area of the opening. Therefore, the compressed air easily flows toward the opening.

According to a preferred embodiment of the embodiments in which the electric wire printing device includes the tubular member, the supply inlet runs through the tubular member in a direction crossing the longitudinal direction of the electric wire.

According to this embodiment, the compressed air easily circles around the electric wire. In the case where the compressed air easily circles around the electric wire, the ink is dried regardless of the direction of the printed portion. Even in the case where the printed portion is not directed as being set for a reason that, for example, the electric wire is twisted in a circumferential direction thereof, the ink is dried.

According to a preferred embodiment of the above-described embodiments, the supply inlet is provided so as to be shifted with respect to the transportation path of the electric wire as seen in a direction in which the supply inlet runs through the tubular member.

According to this embodiment, the supply inlet and the transportation path of the electric wire are shifted with respect to each other, so that the compressed air supplied from the supply inlet is prevented from directly hitting the printed portion. Therefore, decline in the printing quality, which is caused by the compressed air being jetted directly toward the ink in a non-dried state, is suppressed.

Advantageous Effects of Invention

An electric wire printing device according to the present invention dries ink injected onto an electric wire in a short time.

DESCRIPTION OF EMBODIMENTS

[Configuration of the Printing Device]

Figure 1:
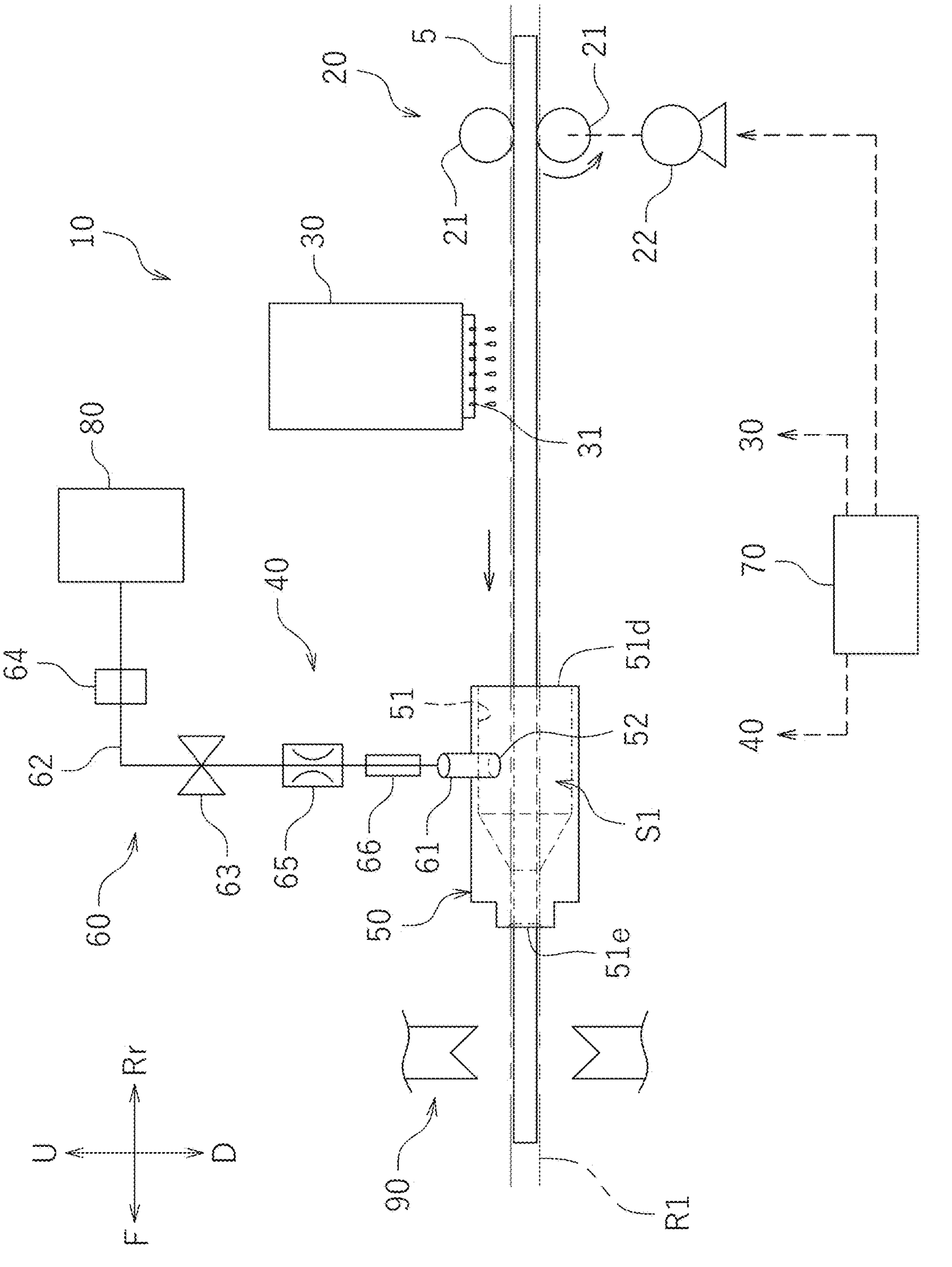
FIG. 1 is a schematic view showing a configuration of an electric wire printing device according to an embodiment.

FIG. 1 is a schematic view showing a configuration of an electric wire printing device 10 (hereinafter, referred to as the "printing device 10") according to an embodiment of the present invention. In the following description, referring to FIG. 1, the left side, the right side, the up side, the down side, the side closer to the viewer of FIG. 1, and the side farther from the viewer of FIG. 1 will be respectively defined as the front side, the rear side, the up side, the down side, the left side and the right side with respect to the printing device 10. In the drawings, letters F, Rr, L, R, U and D respectively represent front, rear, left, right, up and down with respect to the printing device 10. Note that these directions are merely defined for the sake of description, and do not limit the present invention in any way.

As shown in FIG. 1, the printing device 10 according to this embodiment includes a transportation device 20 transporting an electric wire 5, an inkjet head 30 performing printing on the electric wire 5, a drying device 40 drying ink landed on the electric wire 5, and a controller 70. A clamp 90 holding the electric wire 5 in a post-printing state and a cutting device (not shown) for the electric wire 5 are provided to the front of the printing device 10.

The transportation device 20 transports the electric wire 5 in a longitudinal direction of the electric wire 5. In this embodiment, the front side is a downstream side in a transportation direction of the electric wire 5. The rear side is an upstream side in the transportation direction of the electric wire 5. Note that the transportation direction of the electric wire 5 is not limited to the front-rear direction. In the following, the upstream side in the transportation direction of the electric wire 5 and the downstream side in the transportation direction of the electric wire 5 may also be simply referred to as the "upstream" and the "downstream" when appropriate. As shown in FIG. 1, the transportation device 20 includes a pair of transportation rollers 21 and a transportation motor 22 rotating the pair of transportation rollers 21. The pair of transportation rollers 21 face each other. The electric wire 5 is held between the pair of transportation rollers 21. One of the pair of transportation rollers 21 rotates in this state, and as a result, the electric wire 5 is transported in the longitudinal direction thereof.

Figure 2:
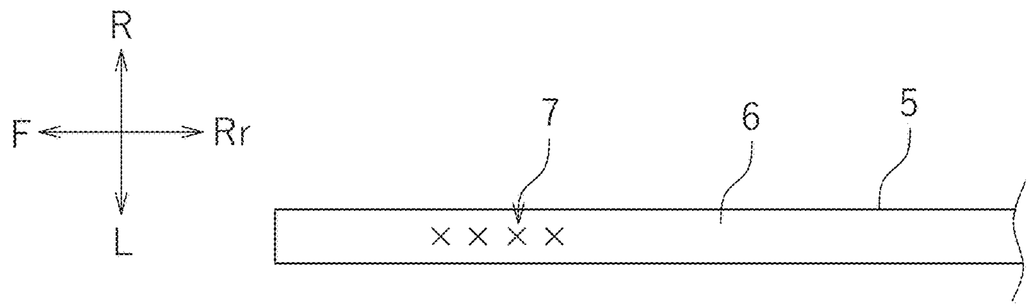
FIG. 2 is a schematic plan view showing an example of electric wire in a post-printing state.

The inkjet head 30 is provided downstream with respect to the transportation device 20. The transportation device 20 transports the electric wire 5 in a pre-printing state to the inkjet head 30. The inkjet head 30 injects ink to perform printing on the electric wire 5. FIG. 2 is a schematic plan view showing an example of the electric wire 5 in the post-printing state. As shown in FIG. 2, the inkjet head 30 forms a printed image 7, with the injected ink, on a sheath 6 provided as an outermost element of the electric wire 5. The sheath 6 is an insulating sheath covering a core of the electric wire 5, and is formed of, for example, a resin. The printed image 7 includes, for example, letters, symbols, graphical patterns and the like representing information such as specifications, uses, an orientation, a model number and the like of the electric wire 5. Note that the image to be printed on the electric wire 5 is not limited to the above. There is no specific limitation on the color of the printed image 7. The printed image 7 may have a plurality of colors.

The inkjet head 30 includes a great number of nozzles 31 injecting ink downward. Such a plurality of nozzles 31 are provided in a bottom surface of the inkjet head 30. The plurality of nozzles 31 are located above a transportation path R1, along which the electric wire 5 is to be transported by the transportation device 20. In this embodiment, the ink to be injected from the nozzles 31 of the inkjet head 30 is solvent ink containing a dye or a pigment dissolved in a solvent. The solvent ink is solidified by the solvent being volatilized. There is no specific limitation on the type of ink to be injected from the inkjet head 30 as long as the ink is solidified by the solvent being volatilized. The ink may be, for example, aqueous ink containing water as the solvent. The solvent is naturally volatilized, and therefore, the ink may be naturally dried. However, it requires a certain length of time to naturally dry the ink.

The drying device 40 is provided downstream, in the transportation direction of the electric wire 5, with respect to the inkjet head 30. The transportation device 20 transports the electric wire 5, after the inkjet head 30 performs printing on the electric wire 5, from below the inkjet head 30 to the drying device 40. The drying device 40 blows air toward a printed portion on the electric wire 5 to dry the ink on the electric wire 5. Note that the drying device 40 may blow gas other than the air toward the printed portion on the electric wire 5. The drying device 40 rapidly volatilizes the solvent in the ink to solidify the ink in a short time. As shown in FIG. 1, the drying device 40 includes a tubular guide pipe 50 provided so as to surround the transportation path R1 of the electric wire 5 and an air supply 60 supplying compressed air to the guide pipe 50. In the guide pipe 50, an inner space S1, through which the electric wire 5 is to pass, is demarcated. In this embodiment, the guide pipe 50 includes an insertion hole 51, through which the electric wire 5 is to be inserted. A space inner in a radial direction of the insertion hole 51 forms the inner space S1. The transportation device 20 transports the electric wire 5 such that the electric wire 5 passes through the insertion hole 51.

Figure 3:
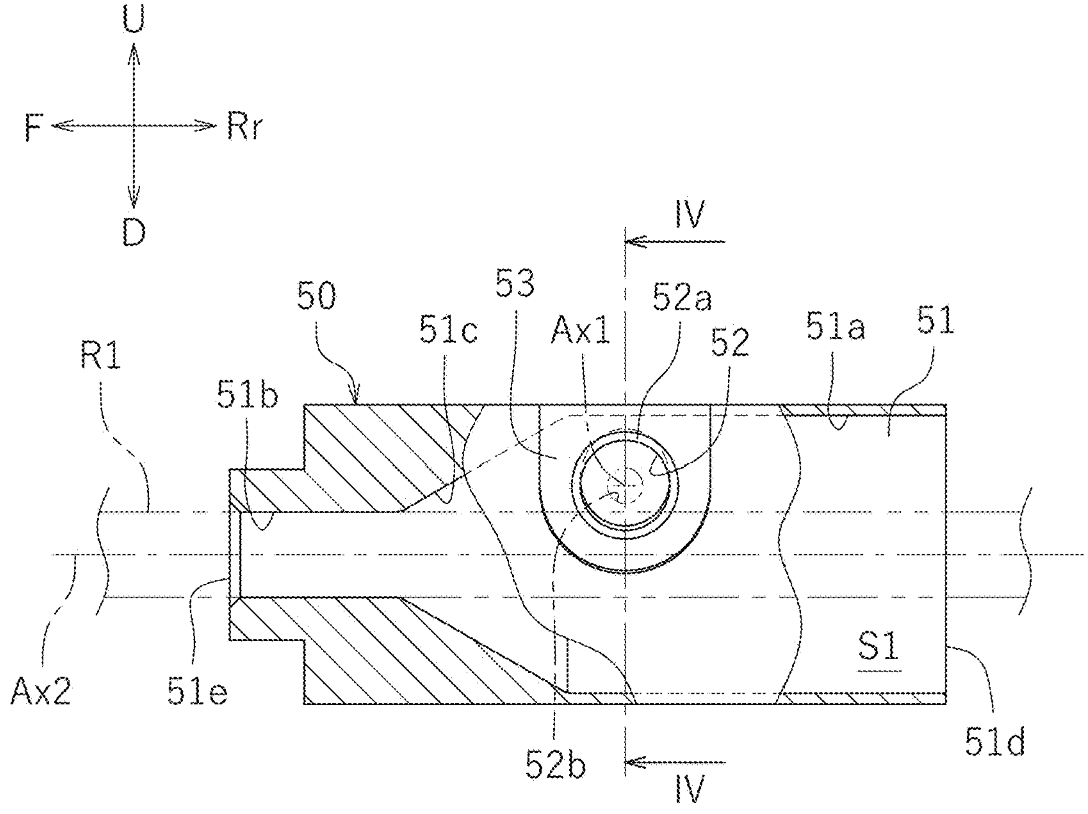
FIG. 3 is a partial cross-sectional view of a guide pipe as seen in a side view.
Figure 4:
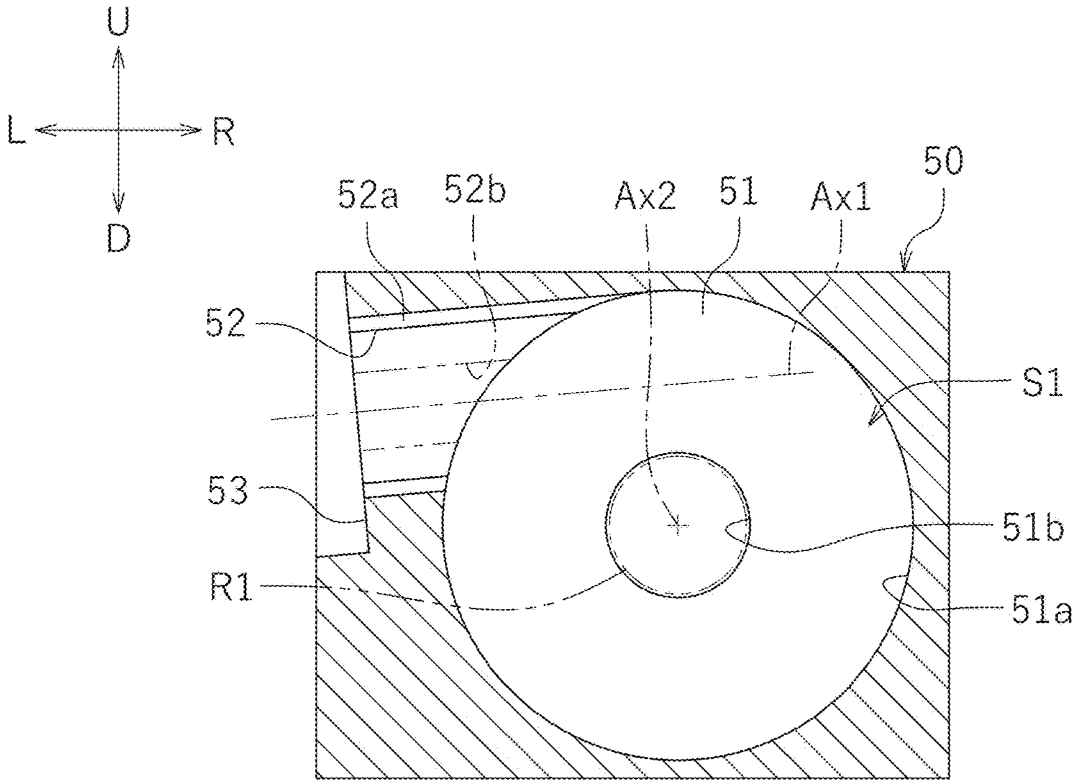
FIG. 4 is a cross-sectional view of the guide pipe passing through an air supply inlet, taken along a radial direction thereof.

FIG. 3 is a partial cross-sectional view of the guide pipe 50 as seen in a side view. FIG. 4 is a cross-sectional view taken along line IV-IV of FIG. 3. FIG. 4 shows a cross-section of the guide pipe 50 taken along a plane extending in the left-right direction and the up-down direction. As shown in FIG. 3 and FIG. 4, the guide pipe 50 includes the insertion hole 51 forming the inner space S1, an air supply inlet 52 opened toward the inner space S1, and a joint seating surface 53 for an air joint 61 (see FIG. 1) to be connected with the air supply inlet 52. The air supply inlet 52 is a hole through which the compressed air, formed by an air compressor 80 (see FIG. 1) external to the printing device 10, is to be supplied.

The insertion hole 51 runs through the guide pipe 50 in the front-rear direction. As shown in FIG. 3, the insertion hole 51 includes a long diameter portion 51*a*, a short diameter portion 51*b*, a tapering portion 51*c*, an entrance opening 51*d*, and an electric wire exit 51*e*. The long diameter portion 51*a* forms an upstream portion of the insertion hole 51. As shown in FIG. 4, the long diameter portion 51*a* has a tubular shape. As shown in FIG. 3, the long diameter portion 51*a* has a diameter longer than a diameter of the electric wire 5 (see the transportation path R1 of the electric wire 5). In this embodiment, the diameter of the long diameter portion 51*a* is longer than 1.5 times the diameter of the electric wire 5. In a state where the electric wire 5 is inserted into the insertion hole 51, a tubular space is formed between an inner wall of the long diameter portion 51*a* and the electric wire 5.

The entrance opening 51*d* is opened so as to allow the inner space S1 and a space outside the guide pipe 50 to communicate with each other. In this embodiment, the entrance opening 51*d* is provided at an upstream end of the guide pipe 50. The entrance opening 51*d* is an upstream end of the long diameter portion 51*a*. The transportation device 20 inserts the electric wire 5 from the entrance opening 51*d* into the inner space S1 of the guide pipe 50. As described below in more detail, the entrance opening 51*d* is also an air discharge opening through which the compressed air supplied from the air supply inlet 52 is to be discharged from the inner space S1.

The short diameter portion 51*b* forms a downstream portion of the insertion hole 51. As shown in FIG. 4, the short diameter portion 51*b* also has a tubular shape. The short diameter portion 51*b* is concentric with the long diameter portion 51*a* as seen in the front-rear direction. The short diameter portion 51*b* has a diameter shorter than the diameter of the long diameter portion 51*a* and substantially equal to the diameter of the electric wire 5. The diameter of the short diameter portion 51*b* is slightly longer than the diameter of the electric wire 5, such that the electric wire 5 passes through the short diameter portion 51*b*. The tapering portion 51*c* is formed between the long diameter portion 51*a* and the short diameter portion 51*b*. The tapering portion 51*c* has a tapering shape which has a diameter decreasing toward the downstream side in the transportation direction of the electric wire 5.

The electric wire exit 51*e* is provided at a downstream end of the guide pipe 50. The electric wire exit 51*e* is an exit for the electric wire 5 and allows the electric wire 5 to pass therethrough. In this embodiment, the electric wire exit 51*e* is a downstream end of the short diameter portion 51*b*. The electric wire exit 51*e* has an opening area smaller than an opening area of the entrance opening 51*d*.

As shown in FIG. 3, the air supply inlet 52 is opened toward a side surface of the guide pipe 50. As shown in FIG. 4, the air supply inlet 52 runs through the guide pipe 50 in a direction crossing the longitudinal direction of the electric wire 5 (in this embodiment, the longitudinal direction of the electric wire 5 is the front-rear direction). In this embodiment, the air supply inlet 52 runs through the guide pipe 50 in a direction oblique to the left-right direction so as to perpendicularly cross the front-rear direction, which is the transportation direction of the electric wire 5, and reaches the inner wall of the long diameter portion 51*a*. Such a positional arrangement of the air supply inlet 52 allows the entrance opening 51*d* to be located upstream, in the transportation direction of the electric wire 5, with respect to the air supply inlet 52. Such a positional arrangement of the air supply inlet 52 allows the electric wire exit 51*e* to be located downstream, in the transportation direction of the electric wire 5, with respect to the air supply inlet 52.

An inner wall of the air supply inlet 52 has a screw 52*a* formed therein. The air joint 61 includes a screw portion engageable with the screw 52*a*, and thus is connected with the air supply inlet 52. The joint seating surface 53 is formed around an outer end of the air supply inlet 52 (end exposed to an outer surface of the guide pipe 50), such that the joint seating surface 53 perpendicularly crosses an axis Ax1 of the air supply inlet 52.

As shown in FIG. 3, the air supply inlet 52 (in this embodiment, a substantial air supply inlet 52, that is, a flow path, in the air joint 61, represented by reference sign 52*b*; see also FIG. 4) is provided so as to be shifted with respect to the transportation path R1 of the electric wire 5 as seen in the direction in which the air supply inlet 52 runs through the guide pipe 50). The axis Ax1 of the air supply inlet 52 is shifted so as not to cross an axis Ax2 of the insertion hole 51 (the axis Ax2 is also the central line of the transportation path R1 of the electric wire 5).

The air supply 60 controls the supply of the compressed air into the air supply inlet 52. The compressed air is generated by the air compressor 80 external to the printing device 10. Note that the printing device 10 may include a device generating the compressed air like an air compressor. As shown in FIG. 1, the air supply 60 includes the air joint 61, an air flow path 62, an open/close valve 63, a decompression valve 64, a flow rate adjusting valve 65, and a heater 66.

The air joint 61 is in engagement with the screw 52*a* of the air supply inlet 52. The air joint 61 is in contact with the joint seating surface 53. The air flow path 62 connects the air compressor 80 and the air joint 61 to each other. In this embodiment, the air flow path 62 is a flexible tube. One of ends of the air flow path 62 is connected with the air joint 61, and the other end of the air flow path 62 is connected with the air compressor 80.

The open/close valve 63, the decompression valve 64 and the flow rate adjusting valve 65 are provided on the air flow path 62. The open/close valve 63 closes or opens the air flow path 62. The open/close valve 63 is, for example, an electromagnetic valve. The open/close valve 63 is connected with the controller 70, and is controlled by the controller 70. The open/close valve 63 opens or closes the air flow path 62 under the control of the controller 70, and as a result, the compressed air is supplied to the drying device 40 or the supply of the compressed air to the drying device 40 is stopped. The decompression valve 64 decreases the pressure of the compressed air generated by the air compressor 80 down to a pressure suitable for use in the drying device 40.

The flow rate adjusting valve 65 adjusts the flow rate of the compressed air to a flow rate suitable for use in the drying device 40.

The heater 66 heats the compressed air in the air flow path 62. In this embodiment, the heater 66 is a tape-like heater wound around the air flow path 62. The heater 66 heats the air flow path 62 and thus heats the compressed air in the air flow path 62. The heating by the heater 66 allows the drying device 40 to blow warm air having a temperature higher than room temperature (temperature around the drying device 40) toward the electric wire 5 in the drying device 40. The temperature of the heater 66 may be controlled by the controller 70. Alternatively, the controller 70 may only control the heater 66 to be activated or to be stopped, whereas the heater 66 may control the temperature thereof.

The above-described configuration of the air supply 60 is a preferred example, and the configuration of the air supply 60 is not limited to this. The air flow path 62 is not limited to being a tube, and may be, for example, a non-flexible pipe. The open/close valve 63 is not limited to an electromagnetic valve, and may be, for example, a motor-drivable valve. The heater 66 is not limited to a sheet-like heater that can be wound around, and may be, for example, a hot air generator that heats the air passing therein. The heater 66 may heat the guide pipe 50. The drying device 40 does not need to include the heater 66. The drying device 40 does not need to include the open/close valve 63, the decompression valve 64 or the flow rate adjusting valve 65.

The controller 70 is connected with the transportation device 20, the inkjet head 30 and the drying device 40, and controls operations of these elements. There is no specific limitation on the configuration of the controller 70. The controller 70 may include, for example, a central processing unit (CPU), a ROM storing, for example, a program to be executed by the CPU, a RAM and the like. Processing portions of the controller 70 may be formed of software or hardware. The processing portions may each be a processor or a circuit. The controller 70 may be, for example, a programmable controller, a computer or the like. The controller 70 may be a computer exclusively usable for the printing device 10, or a general-purpose computer such as a personal computer or the like. The controller 70 may be a computer on the cloud.

[Printing Process]

Hereinafter, an example of process of performing printing on the electric wire 5 by the printing device 10 will be described. Note that the printing process described below is merely a preferred example, and the printing process on the electric wire 5 is not limited to the one described below. Such a preferred example of the printing process on the electric wire 5 is as follows. In an initial step, the electric wire 5 is transported by the transportation device 20 to a position below the inkjet head 30. The inkjet head 30 is driven while the electric wire 5 is passing below the inkjet head 30 and prints the predetermined image 7 on the sheath 6 of the electric wire 5 that is being transported. At this point, the ink of the printed image 7 is not dried yet, and may be smudged or erased if, for example, being touched by another item.

In this embodiment, at the same time as, or substantially at the same time as, the start of the transportation of the electric wire 5, the air supply 60 starts supplying the compressed air to the guide pipe 50. Note that there is no specific limitation on the timing when the supply of the compressed air to the guide pipe 50 is started.

When the injection of the ink onto the electric wire 5 is completed, the electric wire 5 is inserted into the insertion hole 51 of the guide pipe 50 by the transportation device 20. The transportation device 20 inserts the electric wire 5 into the guide pipe 50 from the entrance opening 51*d*. The transportation device 20 continues transporting the electric wire 5. As a result, a front end portion of the electric wire 5 is inserted into the short diameter portion 51*b* of the insertion hole 51. The electric wire 5 is not always linear and may be slightly curved or bent. Even in such a case, the electric wire 5 is guided into the short diameter portion 51*b* by the tapering portion 51*c*. The electric wire 5 may be twisted in a circumferential direction thereof. In such a case, the printed image 7 may not be directed upward.

Then, the front end portion of the electric wire 5 exits the guide pipe 50 from the electric wire exit 51*e*. A portion of the electric wire 5 that is outside the guide pipe 50 passes through a space inner to claws of the clamp 90. At this point, the ink of the printed image 7 has already been dried and the ink has been solidified. Therefore, the printed image 7 is not smudged or erased even if being touched by the clamp 90. When the electric wire 5 is inserted, by a predetermined length, into the cutting device (not shown) provided downstream, in the transportation direction, with respect to the clamp 90, the transportation of the electric wire 5 is stopped. The electric wire 5 is held by the clamp 90 at this position, and is cut into a predetermined length by the cutting device. After this, in a state where the electric wire 5 is already inserted into the guide pipe 50, the printing of the image 7, the drying, and the cutting of the electric wire 5 are repeated in the same manner as described above.

Figure 5:
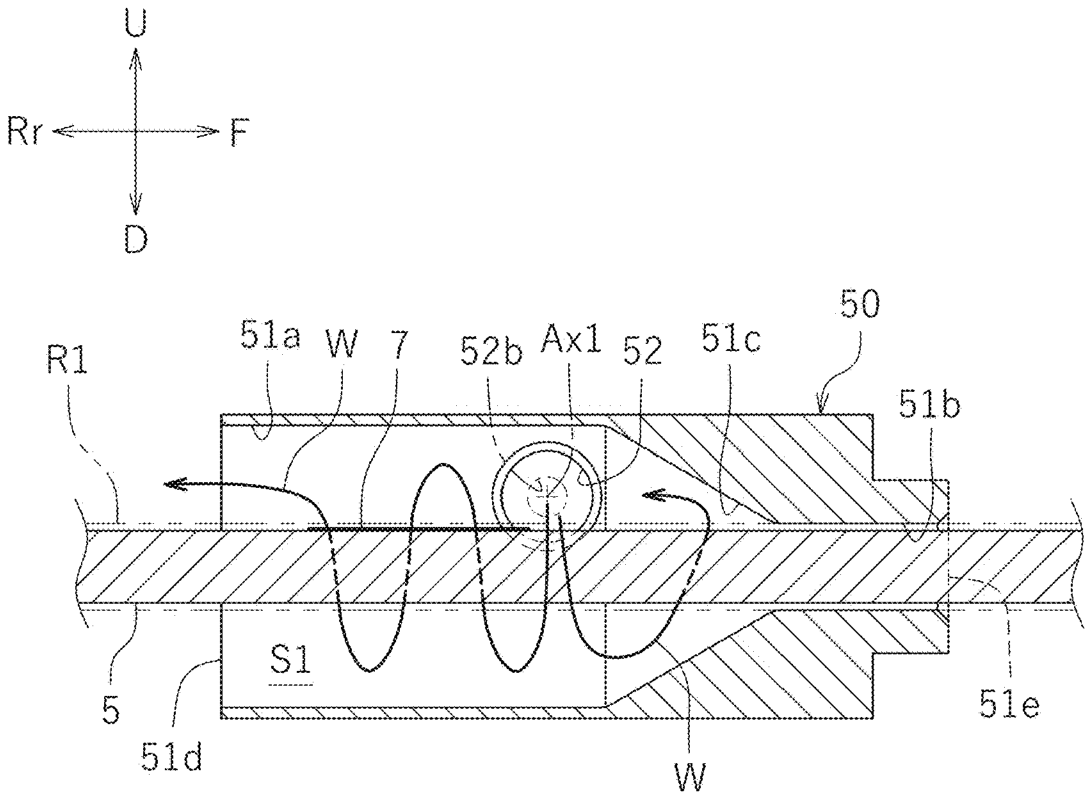
FIG. 5 is a cross-sectional view of the guide pipe as seen in a side view, schematically showing a flow of compressed air.
Figure 6:
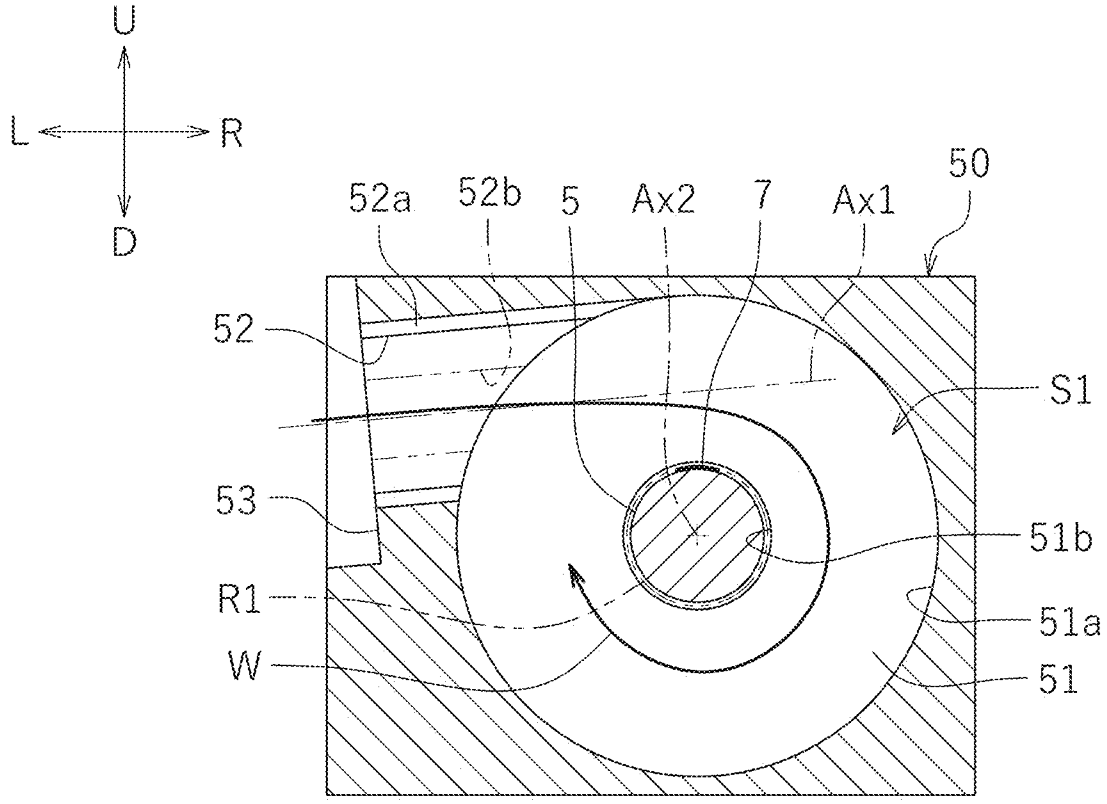
FIG. 6 is a cross-sectional view of the guide pipe as seen in a rear view, schematically showing the flow of the compressed air.

Hereinafter, the state inside the guide pipe 50 having the electric wire 5 inserted thereto will be described. FIG. 5 is a cross-sectional view of the guide pipe 50 as seen in a side view, and schematically shows the flow of the compressed air. FIG. 6 is a cross-sectional view of the guide pipe 50 as seen in a rear view, and schematically shows the flow of the compressed air. In FIG. 5 and FIG. 6, arrow W represents the flow of the compressed air. As shown in FIG. 6, the compressed air, flowing from the air supply inlet 52 into the inner space S1 of the guide pipe 50, flows so as to circle around the transportation path R1 of the electric wire 5 as seen in the front-rear direction. In this embodiment, the air supply inlet 52 (here, the substantial air supply inlet 52*b*) is provided such that an extended portion of the axis Ax1 thereof does not cross the transportation path R1 of the electric wire 5. Therefore, the compressed air flowing from the air supply inlet 52 into the inner space S1 easily flows so as to circle around the transportation path R1 of the electric wire 5. The compressed air flowing from the air supply inlet 52 into the inner space S1 is not directly blown toward the electric wire 5, in particular, toward the printed image 7.

As shown in FIG. 5, after the electric wire 5 is inserted into the short diameter portion 51*b* of the insertion hole 51, the electric wire exit 51*e* is almost closed by the electric wire 5. Therefore, an exit through which the flow W of the compressed air can go out of the guide pipe 50 is almost limited to the entrance opening 51*d*. As a result, the compressed air flows upstream in the transportation direction of the electric wire 5. As shown in FIG. 5, the compressed air flows upstream in the transportation direction of the electric wire 5 while spirally circling around the electric wire 5. The opening area of the entrance opening 51*d* is at least larger than the opening area of the electric wire exit 51*e*, and thus, is larger than a cross-sectional area of the electric wire 5. Therefore, the entrance opening 51*d* is not closed by the electric wire 5. As a result, the flow W of the compressed air directed upstream in the transportation direction of the electric wire 5 is generated.

The flow W of the compressed air directed upstream in the transportation direction of the electric wire 5 while spirally circling around the electric wire 5 acts advantageously to dry the ink of the printed image 7. First, the guide pipe 50 is formed to have a tubular shape surrounding the transportation path R1 of the electric wire 5, and therefore, the compressed air supplied into the guide pipe 50 is not easily diffused. This allows the ink to be dried in a shorter time than in the case where, for example, the compressed air is blown toward the printed image 7 in a free space. This also saves the amount of the compressed air to be used. In addition, the guide pipe 50 is tubular, and therefore, the compressed air supplied from the air supply inlet 52 swirls in the inner space S1 of the guide pipe 50. This allows the swirling compressed air to be blown toward the printed image 7 even in the case where the printed image 7 is not directed as being set for a reason that, for example, the electric wire 5 is twisted in the circumferential direction thereof. The drying device 40 according to this embodiment allows the ink of the printed image 7 to be dried even in the case where the printed image 7 is not directed as being set (more broadly, regardless of the direction of the printed image 7).

In this embodiment, the air supply inlet 52 runs through the guide pipe 50 in a direction crossing the longitudinal direction of the electric wire 5. This makes it easier for the compressed air to circle around the electric wire 5. In addition, in this embodiment, the air supply inlet 52 (here, the substantial air supply inlet 52*b*) is provided so as to be shifted with respect to the transportation path R1 of the electric wire 5 as seen in a direction in which the air supply inlet 52 runs through the guide pipe 50. This also promotes the circling flow of the compressed air around the electric wire 5. In addition, this prevents the compressed air, flowing from the air supply inlet 52, from directly hitting the printed image 7. If the compressed air is directly jetted toward the ink of the printed image 7 in a state where the ink is not dried, the ink may be blown away or moved to undesirably decline the quality of the printed image 7. The drying device 40 according to this embodiment reduces such an undesirable possibility.

In this embodiment, the flow W of the compressed air in the guide pipe 50 is directed upstream in the transportation direction. Such a direction of the flow is opposite to the transportation direction, in which the electric wire 5 is transported by the transportation device 20. The transportation device 20 transports the electric wire 5 downstream in a state where the compressed air is supplied from the air supply inlet 52 into the inner space S1. Therefore, the flow W of the compressed air flows at a speed, with respect to the electric wire 5, that is a sum of a transportation speed of the electric wire 5 and a speed of the compressed air. As a result, the speed of the flow W of the compressed air with respect to the electric wire 5 is increased, and thus the drying of the ink of the printed image 7 is further promoted. Such a flow of the compressed air is generated by the entrance opening 51*d* being provided upstream, in the transportation direction of the electric wire 5, with respect to the air supply inlet 52. In this embodiment, the entrance opening 51*d* is provided at the upstream end of the guide pipe 50, and acts both as an entrance for the electric wire 5 into the guide pipe 50 and an exit for the compressed air from the guide pipe 50. This simplifies the configuration of the guide pipe 50.

In addition, in this embodiment, the opening area of the electric wire exit 51*e* is smaller than the opening area of the entrance opening 51*d*. This causes the compressed air in the guide pipe 50 to be more easily directed upstream in the transportation direction of the electric wire 5. In this embodiment, the opening area of the electric wire exit 51*e* is substantially the same as the cross-sectional area of the electric wire 5. Therefore, in a state where the electric wire 5 passes through the electric wire exit 51*e*, the electric wire exit 51*e* is almost closed by the electric wire 5. As a result, the compressed air in the guide pipe 50 flows upstream in the transportation direction of the electric wire 5.

The present inventors have confirmed by a simulation that the compressed air flows upstream in the transportation direction of the electric wire 5 while spirally circling around the electric wire 5 (flows as shown in FIG. 5 and FIG. 6). The present inventors have also confirmed that the use of the printing device 10 according to this embodiment allows the ink of the printed image 7 to be dried in a much shorter time than natural drying. The temperature of the compressed air contributes to decrease in the time for drying the printed image 7. However, the compressed air may or may not be heated because it is difficult to maintain the temperature of the air flowing in the air supply path 62 while being replaced continuously. According to tests performed by the present inventors, the ink of the printed image 7 is dried in a short time even if the temperature of the compressed air is room temperature. Note that use of, for example, a hot air generator or the like stably maintains the temperature of the air to be supplied to the air supply inlet 52.

OTHER EMBODIMENTS

A preferred embodiment is described above. The above-described embodiment is merely an example, and various other embodiments may be carried out. For example, in the above-described embodiment, the compressed air is blown toward the ink of the printed image 7 while the electric wire 5 is moved. The compressed air may be blown while the electric wire 5 is stopped. In the above-described embodiment, the entrance opening 51*d*, through which the compressed air exits, is opened upstream in the transportation direction of the electric wire 5. The entrance opening 51*d* may be opened downstream in the transportation direction of the electric wire or in any other direction. The opening through which the compressed air exits does not need to be the entrance opening, through which the electric wire is to be inserted.

In the above-described embodiment, the guide pipe 50 includes the electric wire exit 51*e*. The guide pipe 50 does not need to include the electric wire exit 51*e*. In this case, the electric wire may be returned upstream in the transportation direction after the ink is dried. The transportation direction of the electric wire is not limited to the longitudinal direction of the electric wire. The electric wire may be, for example, translated in a direction crossing the longitudinal direction thereof or may circle around.

There is no specific limitation on the configuration of a tubular member, an example of which is the guide pipe 50. It is sufficient that the tubular member is provided so as to surround the transportation path of the electric wire, and includes an air supply inlet through which the compressed air is to be supplied and also includes an opening opened so as to allow the compressed air to be discharged. There is no further limitation on the tubular member. For example, the air supply inlet may be provided substantially parallel to the transportation path of the electric wire. The tubular member only needs to be tubular while the ink of the printed image is dried, and may be of another shape in any other step. For example, the tubular member may include a movable portion, so that the shape thereof is changeable.

Figure 7:
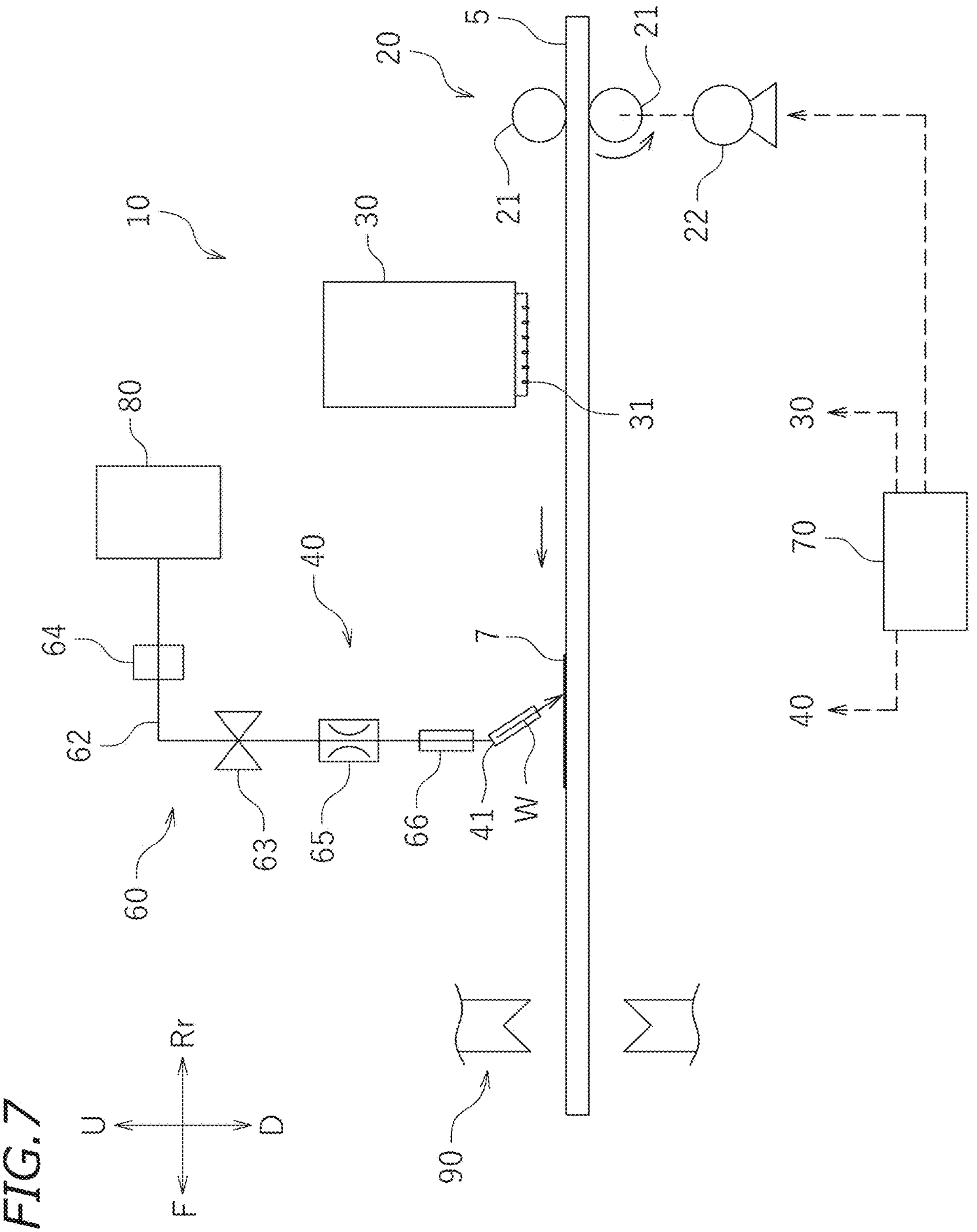
FIG. 7 is a schematic view showing a configuration of an electric wire printing device according to another embodiment.

The electric wire printing device does not need to include a tubular member such as the guide pipe 50. FIG. 7 is a schematic view showing a configuration of an electric wire printing device 10 according to another embodiment. In the following description of the embodiment, elements having the same functions as those in the above-described embodiment will bear the same reference signs as in the above-described embodiment. As shown in FIG. 7, the electric wire printing device 10 according to this embodiment includes the inkjet head 30 injecting ink to perform printing on the electric wire 5, a transportation device 20 transporting the electric wire 5 at least after the inkjet head 30 performs printing on the electric wire 5, and a drying device 40 not including the tubular member. Like in the above-described embodiment, the driving device 40 is provided downstream, in the transportation direction of the electric wire 5, with respect to the inkjet head 30. The drying device 40 according to this embodiment includes an air nozzle 41 blowing air toward a printed portion on the electric wire 5. The air nozzle 41 is connected with the air compressor 80 external to the printing device 10 via the air flow path 62. The open/close valve 63, the decompression valve 64, the flow rate adjusting valve 65 and the heater 66 are provided on the air flow path 62. In this embodiment, the air is blown toward the printed image 7 on the electric wire 5 directly from the air nozzle 41.

As shown in FIG. 7, in this embodiment, the drying device 40 blows the air upstream in the transportation direction of the electric wire 5. Like in the above-described embodiment, the transportation device 40 transports the electric wire 5 while the drying device 40 is blowing the air toward the printed portion on the electric wire 5. As a result, the speed of the flow W of the air with respect to the electric wire 5 is increased. Note that the drying device 40 does not need to blow the air upstream in the transportation direction of the electric wire 5. For example, the drying device 40 may blow the air in a direction perpendicular to the transportation direction of the electric wire 5. In this specification, the expression "blow the air in a direction" encompasses, in a broad sense, generating a flow of the air directed in a predetermined direction by the configuration of a flow path as in, for example, the above-described embodiment.

In the embodiment described with reference to FIG. 7 also, the ink of the printed image 7 is dried in a shorter time than by natural drying. There is no specific limitation on the number of the air nozzle(s) 41, and there may be a plurality of air nozzles 41. The air to be blown toward the printed image 7 on the electric wire 5 does not need to be compressed air generated by an air compressor or the like. The drying device 40 may include, for example, a blower fan that blows air toward the printed image 7 on the electric wire 5.

The embodiments do not limit the present invention unless otherwise specified.

REFERENCE SIGNS LIST

5 Electric wire
7 Printed image
10 Electric wire printing device
20 Transportation device
30 Inkjet head
40 Drying device
50 Guide pipe (tubular member)
51 Insertion hole
51*d* Entrance opening (opening)
51*e* Electric wire exit
52 Air supply inlet (supply inlet)

The invention claimed is:

1. An electric wire printing device, comprising:
an inkjet head injecting ink to perform printing on an electric wire;
a transportation device transporting the electric wire; and
a drying device provided downstream, in a transportation direction of the electric wire, with respect to the inkjet head, the drying device blowing air toward a printed portion on the electric wire; wherein
the transportation device transports the electric wire in a longitudinal direction of the electric wire;
the drying device includes a tubular member provided so as to surround a transportation path of the electric wire;
an inner space is provided in the tubular member through which the electric wire is to pass; and
the tubular member includes:
a large area portion demarcating an upstream portion of the inner space in the transportation direction of the electric wire and including an entrance opening through which the electric wire is inserted, the entrance opening being provided at an upstream end of the upstream portion;
a small area portion demarcating a downstream portion of the inner space in the transportation direction of the electric wire and including an electric wire exit through which the electric wire exits, the electric wire exit being provided at a downstream end of the downstream portion and having an opening area that is smaller than an opening area of the entrance opening;
a tapering portion demarcating an intermediate portion of the inner space between the large area portion and the small area portion and having a tapering shape which has a cross-sectional area decreasing toward the small area portion; and
a supply inlet opens toward the large area portion to allow compressed air to be supplied therethrough.

2. The electric wire printing device according to claim 1, wherein:
the transportation device transports the electric wire while the compressed air is supplied from the supply inlet.

3. The electric wire printing device according to claim 1, wherein the supply inlet runs through the tubular member in a direction crossing the longitudinal direction of the electric wire.

4. The electric wire printing device according to claim 3, wherein the supply inlet is provided so as to be shifted with respect to the transportation path of the electric wire as seen in a direction in which the supply inlet runs through the tubular member.

* * * * *